(12) United States Patent
Pekala et al.

(10) Patent No.: US 10,396,330 B2
(45) Date of Patent: Aug. 27, 2019

(54) POROUS GRANULES CONTAINING MIXTURE OF RUBBER AND SILICA POWDERS

(71) Applicant: AMTEK RESEARCH INTERNATIONAL LLC, Lebanon, OR (US)

(72) Inventors: Richard W. Pekala, Corvallis, OR (US); Jeff Frenzel, Albany, OR (US); Robert R. Waterhouse, Lebanon, OR (US)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 0 days.

(21) Appl. No.: 15/385,531

(22) Filed: Dec. 20, 2016

(65) Prior Publication Data

US 2017/0104197 A1    Apr. 13, 2017

Related U.S. Application Data

(63) Continuation of application No. PCT/US2015/036804, filed on Jun. 19, 2015.

(60) Provisional application No. 62/015,300, filed on Jun. 20, 2014.

(51) Int. Cl.

| | |
|---|---|
| *H01M 2/16* | (2006.01) |
| *B29C 48/00* | (2019.01) |
| *H01M 2/14* | (2006.01) |
| *B01J 2/04* | (2006.01) |
| *B29B 11/12* | (2006.01) |
| *B29B 11/16* | (2006.01) |
| *B29D 30/04* | (2006.01) |
| *C08K 3/36* | (2006.01) |
| *B29K 105/16* | (2006.01) |
| *B29K 421/00* | (2006.01) |
| *B29K 509/00* | (2006.01) |
| *B29L 31/34* | (2006.01) |

(52) U.S. Cl.
CPC .............. *H01M 2/166* (2013.01); *B01J 2/04* (2013.01); *B29B 11/12* (2013.01); *B29B 11/16* (2013.01); *B29C 48/022* (2019.02); *B29D 30/04* (2013.01); *C08K 3/36* (2013.01); *H01M 2/145* (2013.01); *H01M 2/1646* (2013.01); *B29K 2023/06* (2013.01); *B29K 2105/16* (2013.01); *B29K 2421/00* (2013.01); *B29K 2509/00* (2013.01); *B29L 2031/3468* (2013.01); *H01M 2220/30* (2013.01)

(58) Field of Classification Search
CPC .......... H01M 2/166; H01M 2/145; B01J 2/04; B29B 11/12; B29B 11/16; B29C 47/0004; B29D 30/04; C08K 3/36
USPC ........................................................ 524/571
See application file for complete search history.

(56) References Cited

U.S. PATENT DOCUMENTS

| | | | |
|---|---|---|---|
| 6,242,127 B1 * | 6/2001 | Paik | ...................... H01M 2/164 429/145 |
| 2006/0281850 A1* | 12/2006 | Tokunaga | .................. B01J 2/10 524/493 |
| 2012/0270110 A1 | 10/2012 | Waterhouse et al. | |

FOREIGN PATENT DOCUMENTS

WO    2014008422 A1    7/2013

\* cited by examiner

*Primary Examiner* — Kelechi C Egwim
(74) *Attorney, Agent, or Firm* — Stoel Rives LLP

(57) ABSTRACT

Granules containing mixtures of silica powder and cross-linked rubber powder are used in the manufacture of battery separators or vehicle tires. A granule contains silica and rubber powders in proportional amounts that form a silica powder carrier within which rubber powder particles are distributed. Incorporating silica-rubber granules in the manufacturing process of polyethylene separators offers a way to limit water loss in and improve the cycle life of a deep cycle lead-acid battery. Incorporating silica-rubber granules in the manufacturing process of vehicle tires affords advantages including easier material handling, reduced production of dust, and reduction in the number of ingredients measured and added to the formulation.

18 Claims, 4 Drawing Sheets

POROUS GRANULES CONTAINING MIXTURE OF RUBBER AND SILICA POWDERS

CROSS-REFERENCE TO RELATED APPLICATIONS

This application is a continuation of International Patent Application No. PCT/US2015/036804, filed Jun. 19, 2015, entitled "POROUS GRANULES CONTAINING MIXTURE OF RUBBER AND SILICA POWDERS" and published as WO 2015/196151, which claims the benefit of U.S. Provisional Patent Application No. 62/015,300, filed Jun. 20, 2014, entitled "POROUS GRANULES CONTAINING MIXTURE OF RUBBER AND SILICA POWDERS"; the contents of all of which are hereby incorporated by reference herein in their entirety.

COPYRIGHT NOTICE

©2016 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to macroscopic, porous granules containing a mixture of silica and rubber powders and, in particular, to incorporation of a rubber powder in the manufacture of vehicle tires and battery separators.

BACKGROUND INFORMATION

With respect to vehicle tires, the two major ingredients in a rubber compound are the rubber itself and a filler, combined in such a way as to achieve different objectives. Depending on the intended use of the tire, the objective may be to optimize performance, to maximize traction in both wet and dry conditions, or to achieve superior rolling resistance. The desired objective can be achieved through careful selection of one or more types of rubber, together with the type and amount of filler to blend with the rubber.

In general, there are four major rubbers used: natural rubber, styrene-butadiene rubber (SBR), polybutadiene rubber (BR), and butyl rubber (along with halogenated butyl rubber). The first three are primarily used as tread and sidewall compounds, while butyl rubber and halogenated butyl rubber are primarily used for the inner liner, which is the inside portion that holds the compressed air inside the tire.

The most popular fillers are carbon black and silica, and there are several types of each. Recycled rubber powder can also be used as part of the formulation. The selection depends on the performance requirements, because they are different for the tread, sidewall, and apex. Other ingredients also come into play to aid in the processing of the tire or to function as anti-oxidants, anti-ozonants, and anti-aging agents. In addition, the "cure package"—a combination of curatives and accelerators—is used to form the tire and provide its elasticity.

Once the formulation is determined, the next challenge is how to mix all of the ingredients together. The mixing operation is typically a batch operation, with each batch producing more than 200 kg of rubber compound in fewer than three to five minutes. The mixer is a sophisticated piece of heavy equipment with a mixing chamber that has rotors inside. The main function of the mixer is to break down the rubber bale, fillers, and chemicals and mix them with other ingredients.

The sequence in which the ingredients are added can be critical, as well as the mixing temperature, which can rise as high as 160° C. to 170° C. If the temperature is too high, the compound can be damaged, so the mixing operation is typically accomplished in two stages. The curative package is normally added in the final stage of mixing, and the final mixing temperature cannot exceed 100° C. to 110° C. to prevent occurrence of scorching.

Once the mixing is completed, the batch is dumped out of the mixer and sent through a series of machines to form a continuous sheet called a "slap." The slap is then transferred to other areas for bead wire assembly preparation, inner liner calendering, one or both of steel and fabric belt/ply cord calendering, tire sidewall extrusion, and tire tread extrusion.

Tire components such as tread, sidewall, and apex are prepared by forcing uncured rubber compound through an extruder to shape the tire tread or sidewall profiles. Extrusion is an important operation in the tire manufacturing process because it processes most of the rubber compounds produced from the mixing operation and then prepares various components for the ultimate tire building operation.

With respect to battery separators, a lead-acid storage battery is commonly found in two modes of design: the valve-regulated recombinant cell and the flooded cell. Both modes include positive and negative electrodes that are separated from each other by a porous battery separator. The porous separator prevents the electrodes from coming into physical contact and provides space for an electrolyte to reside. Such separators are formed of materials that are resistant to the sulfuric acid electrolyte and sufficiently porous to permit the electrolyte to reside in the pores of the separator material, thereby permitting ionic current flow with low resistance between adjacent positive and negative plates.

Separators for lead-acid storage batteries have been formed of different materials as the technology has developed. Sheets of wood, paper, rubber, PVC, fiberglass, and silica-filled polyethylene have all found use over time. A type of separator currently favored for use in flooded lead-acid storage batteries used in automotive starting-lighting-ignition (SLI) service is the silica-filled polyethylene separator. The microporous polyethylene matrix contains a large fraction of silica particles to provide wettability for the acid electrolyte and to help define the pore structure of the separator. A separator of this type is described in U.S. Pat. No. 7,211,322.

Another application for flooded lead-acid storage batteries is the traction or deep-cycle battery, which commonly uses a separator made partly of rubber. Traditionally, this separator was a porous hard rubber, cross-linked with sulfur. Improvements on the rubber separator have included the addition of silica particulate filler to the rubber matrix before curing, and cross-linking with electron-beam radiation instead of chemical cross-linking agents.

All of these rubber-containing separators have the advantageous effects for deep-cycle batteries of promoting long cycle life by controlling water loss during charge. During the charging of the lead-acid storage battery, the active material on the negative electrode is first reduced from lead sulfate to lead. As the available active material is converted to lead, the potential of the electrode is lowered. As the potential on the negative electrode drops, an increasing fraction of the charging current is involved in the evolution of hydrogen by reduction of the hydronium ions present in the adjacent electrolyte. Meanwhile, at the positive electrode, the charging operation is oxidizing the active material from lead sulfate to lead oxide, accompanied by a rise in the potential of the positive electrode. As the potential rises, an increasing fraction of the charging current is involved in the production of oxygen by oxidation of adjacent water molecules and the production of hydronium ions to replace those consumed at the negative electrode. The net effect of the evolution of hydrogen at the negative electrode and the evolution of oxygen at the positive electrode is the consumption of water from the acid electrolyte. This loss of water results in an increase in the concentration of the sulfuric acid, an increase in the resistance of the battery, and eventual failure. By reducing the rate of water loss from the battery, rubber-containing separators extend the service life of deep cycle batteries.

Despite the advances made in the art with respect to improved separators containing some form of rubber, there continues to be a need for a low-cost separator, with low resistance to ion flow that limits the water loss and improves the cycle life of lead-acid storage batteries used in deep cycle service.

SUMMARY OF THE DISCLOSURE

This disclosure relates to the use of granules that contain mixtures of silica powder and cross-linked rubber powder in the manufacture of battery separators or vehicle tires. A granule contains silica and rubber powders in proportional amounts that form a silica powder carrier within which rubber powder particles are distributed. Incorporating silica-rubber granules in the manufacturing process of polyethylene separators offers a way to limit water loss in and improve the cycle life of a deep cycle lead-acid battery. Incorporating silica-rubber granules in the manufacturing process of vehicle tires and battery separators affords advantages including easier material handling, reduced production of dust, and reduction in the number of ingredients measured and added to the formulation.

Additional aspects and advantages will be apparent from the following detailed description, which includes reference to the accompanying drawings.

DETAILED DESCRIPTION

Figure 1A:
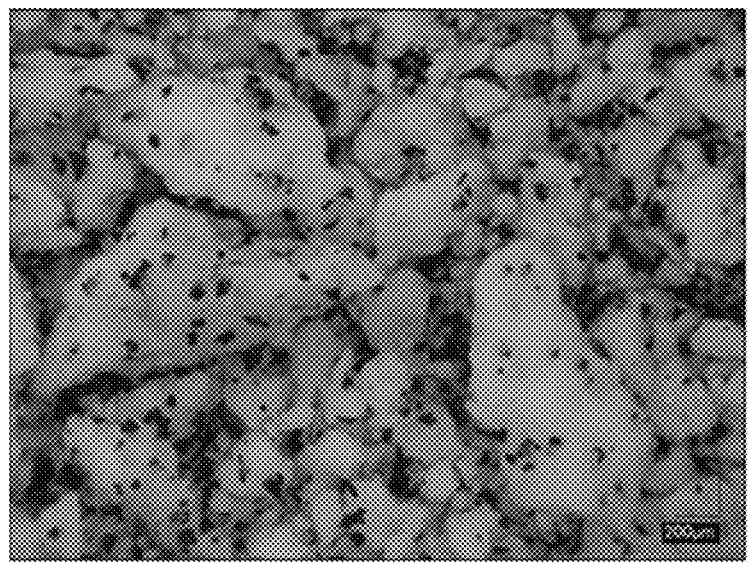
FIGS. 1A and 1B are optical micrographs showing, respectively, lower and higher magnifications of silica-rubber granules formed by mechanical compression.

The following describes silica-rubber granules containing a mixture of silica and rubber powders. Additionally, methods of using the silica-rubber granules in the manufacture of vehicle tires and battery separators are described herein. The macroscopic silica-rubber granules are inherently dust-formation suppressing. By comparison, silica particles and rubber particles, such as particles in the 100 nm to 100 micron size range, can release a significant amount of silica and rubber dust as the materials are poured into a hopper during manufacturing.

Benefits of the dust-formation suppressing silica-rubber granules include less material loss from dust entrained in air during conveying and handling, reduced worker exposure to silica and rubber particle dust, decreased personal protective equipment requirements, and a cleaner workplace. The granules have additional shipping and handling benefits as compared to smaller particles. The increased bulk density of the granules reduces the shipping costs. The low friability and high crush strength facilitate ease of handling. The granules are free-flowing, which results in better conveying and feeding to manufacturing equipment.

As used herein, "particles" includes agglomerates of particles as well. For example, silica particles can agglomerate together, depending on factors such as the density of silanol groups on the surface of the particles. Precipitated silica agglomerates can be as large as about 40 microns. By contrast, the silica-rubber granules described herein are larger than silica agglomerates. For example, the macroscopic granules can have a size of about 100 microns to about 5 mm or about 500 microns to about 5 mm.

The silica-rubber granule contains a first amount of a silica powder component and a second amount of a rubber powder component, the first amount of the silica powder component being greater than the second amount of the rubber powder component to form a granule in which the silica powder component is a carrier within which the rubber powder component is distributed.

The silica powder component and the rubber powder component can be held together by compression-formed adhesion to form the granule. Alternatively, the silica powder component and the rubber powder component can be held together by spray-drying formed adhesion to form the granule. The spray-drying can be from a mixture including a solvent, the silica powder component, and the rubber powder component. A common solvent is water, although other solvents can be used. In many cases, when using compression or spray-drying to form the granule, the addition of a binder will not be required to form the granule.

The silica powder can contain precipitated silica, precipitated silica derivatives, fumed silica, fumed silica derivatives, or mixtures thereof. There are numerous derivatives of precipitated silica and fumed silica that one of ordinary skill in the art, with the benefit of this disclosure, would understand could be used in the silica-rubber granules. For example, silica particles surface-treated with silane coupling agents or aluminosilicates could be used. The precipitated silica can be amorphous. Furthermore, the precipitated silica can have a surface area of about 50 $m^2/g$ to about 350 $m^2/g$, about 75 $m^2/g$ to about 300 $m^2/g$, about 100 $m^2/g$ to about 250 $m^2/g$, or about 125 $m^2/g$ to about 200 $m^2/g$, as measured by nitrogen adsorption using Brunauer-Emmett-Teller (BET) analysis.

The rubber powder can contain a cross-linked rubber powder, such as, for example, a cross-linked natural rubber, a cross-linked styrene-butadiene rubber, a cross-linked polybutadiene rubber, a cross-linked butyl rubber, derivatives of any of the foregoing, or combinations of any of the foregoing.

The silica-rubber granules can contain additives in addition to the silica powder component and the rubber powder component. The choice of additives will generally depend upon the desired ultimate formulation for the end product, such as a vehicle tire or battery separator. In the case of vehicle tires and battery separators, exemplary additives include carbon black, antioxidants, colorant, and lubricant. The additives can be in powder form for compression formation of the granules, but can also be dissolved in a solvent, such as for spray-drying formation of the granules.

In some cases, the silica-rubber granules contain at least about 60%, at least about 65%, at least about 70%, at least about 75%, at least about 80%, at least about 85%, at least about 90%, or at least about 95% of the silica powder component, on a weight-to-weight basis. Likewise, in some cases, the silica-rubber granules contain less than about 40%, less than about 35%, less than about 30%, less than about 25%, less than about 20%, less than about 15%, less than about 10%, or less than about 5% of the rubber powder component, on a weight-to-weight basis. The silica-rubber granule can contain, for example, a ratio, by weight, of the first amount of the silica powder component to the second amount of the rubber powder component from about 3:2 to about 19:2, about 3:2 to about 9:1, about 7:3 to about 9:1, about 3:1 to about 9:1, or about 4:1 to about 9:1.

As discussed above, methods of manufacturing battery separators are described herein. In particular, methods of manufacturing battery separators with reduced dust production are described herein. In some cases, the methods include mixing, such as in a low-temperature blender, polyethylene with the silica-rubber granule and a plasticizer to form a mixture. The mixture can then be heated above the melting point of the polyethylene and extruded through a sheet die. The resulting extruded sheet can then be processed and calendared in a variety of ways, as is known in the art, to form the finished battery separator. As discussed above, because the silica-rubber granule is inherently dust-formation suppressing, mixing polyethylene with the silica-rubber granule results in reduced dust production as compared to mixing polyethylene with silica particles and rubber particles.

In many cases, the polyethylene is an ultra-high molecular weight polyethylene powder. The plasticizer can be a process oil, such as a naphthenic process oil. Additives, such as carbon black, antioxidants, colorants, and lubricants, can be added at the time of mixing, if not already sufficiently included within the silica-rubber granules themselves.

As is known in the art, additional process oil may be added during the extrusion process. Additional rubber powder, separate from the silica-rubber granules, can be added downstream of the main mixing process.

Without wishing to be bound by theory, it is believed that during rubber compounding or battery separator extrusion, the silica-rubber granules are broken down due to the high shear energy involved in the processes. During the breakdown, the granules are transformed back into silica particles and rubber particles, likely having sizes of about 1 micron to about 100 microns. However, at that point in the processes, the materials are within the process equipment and dust is not liberated to the workplace surrounding the process equipment.

EXAMPLE 1

Figure 1B:
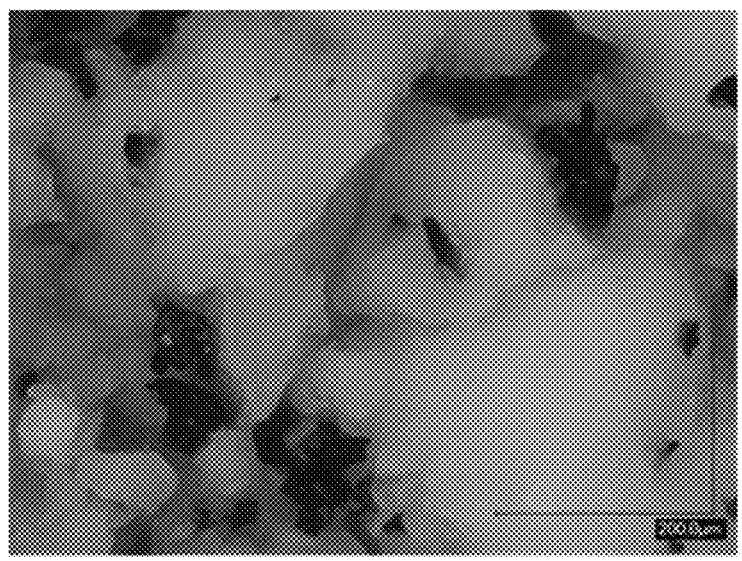

This example represents silica-rubber granules containing an 85/15 mixture, by weight, of precipitated silica and cross-linked rubber powder (Edge Rubber Co.) that were formed by mechanical compression in accordance with a dry granulation process. The uniformity of the rubber dispersion throughout the granule is observed in the optical micrographs at different magnifications shown in FIGS. 1A and 1B.

EXAMPLE 2

This example represents formation of a battery separator by an extrusion process. A mixture of ultra-high molecular-weight polyethylene (UHMWPE), silica-rubber granules formed as described in Example 1, and a naphthenic process oil was blended together and then fed into a 27 mm twin screw extruder. Additional oil was added at the throat of the extruder. The mixture was extruded at elevated temperature (about 215° C.) through a sheet die and into a calender roll stack, where a rib pattern was embossed on the sheet. The oil-filled sheet was then extracted, removing most of the process oil, to form a porous separator containing 65.3 wt. % silica, 11.5 wt. % rubber, and 23 wt. % UHMWPE. The separator had a backweb thickness of 0.33 mm and an overall rib height of 1.08 mm.

Figure 2A:
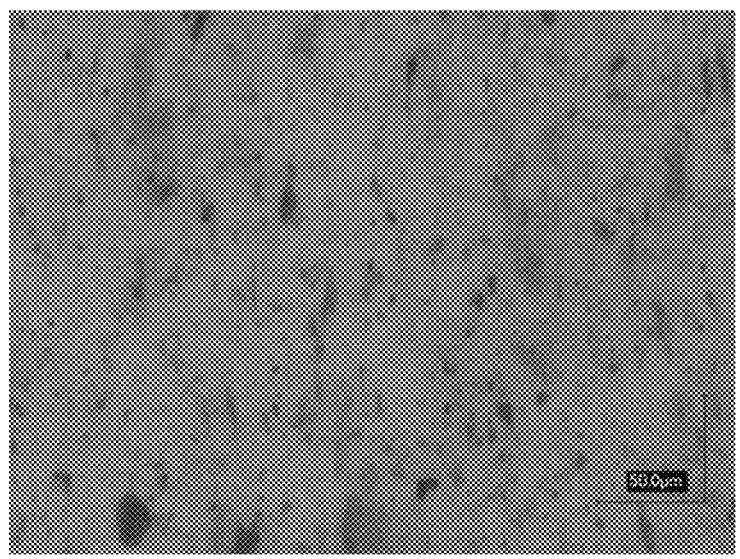
FIGS. 2A and 2B are optical micrographs showing, respectively, surface and cross-sectional views of a polyethylene separator formed from silica-rubber granules as described in Example 2.
Figure 2B:
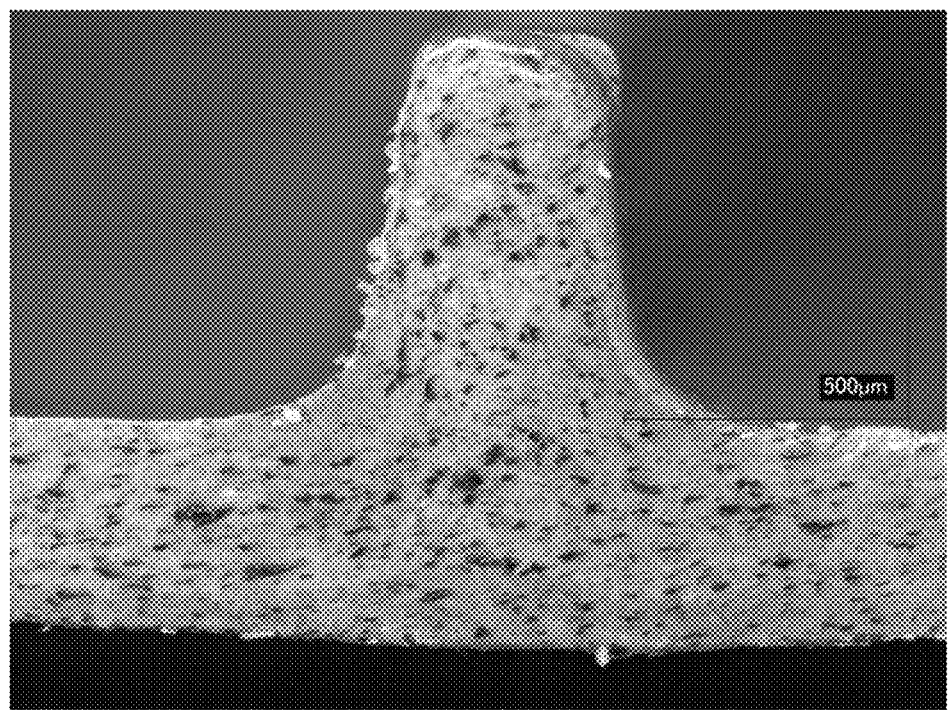

The uniformity of the rubber distribution is shown in the surface and cross-sectional optical micrographs in FIGS. 2A and 2B, respectively.

EXAMPLE 3

This example records data from tests performed on the porous separator formed in Example 2. A leachate solution was formed from the separator in Example 2 by adding 9.94 grams to 100 ml of $H_2SO_4$ (s.g.=1.210) and then heating for 7 days at 70° C. The leachate was then cooled to room temperature, and electrochemical testing was performed with regard to antimony suppression, antimony selectivity, and hydrogen suppression.

Figure 3:
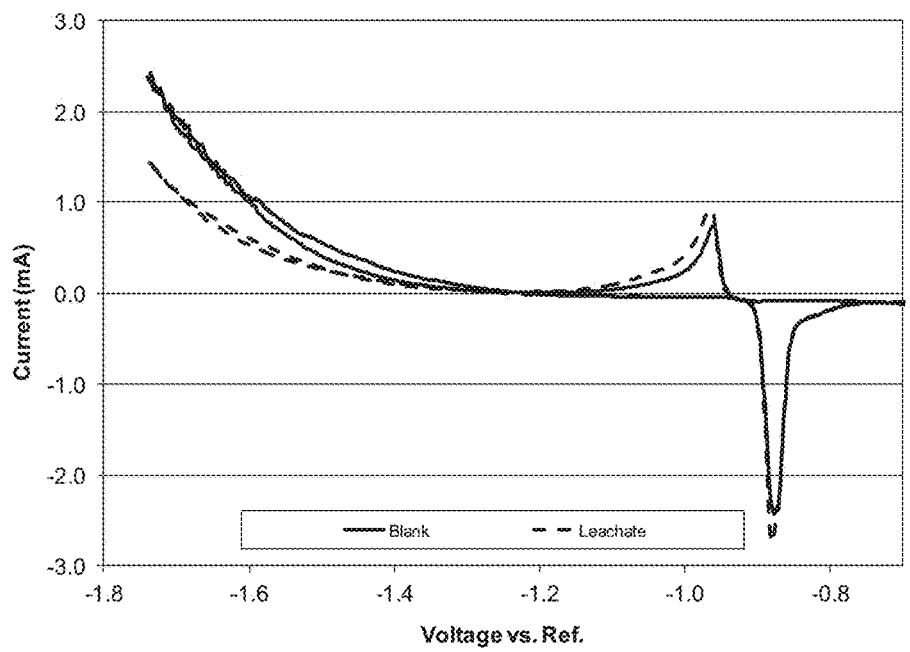
FIG. 3 is a graph showing, by comparison to an acid blank, the hydrogen evolution suppression effect exhibited by the porous separator of Example 2.

FIG. 3 shows that the leachate had a moderate-to-strong suppression effect on $H_2$ evolution. Peak currents for charge and discharge waves are increased, but voltages were stable. Discharge capacity was only slightly increased.

Figure 4:
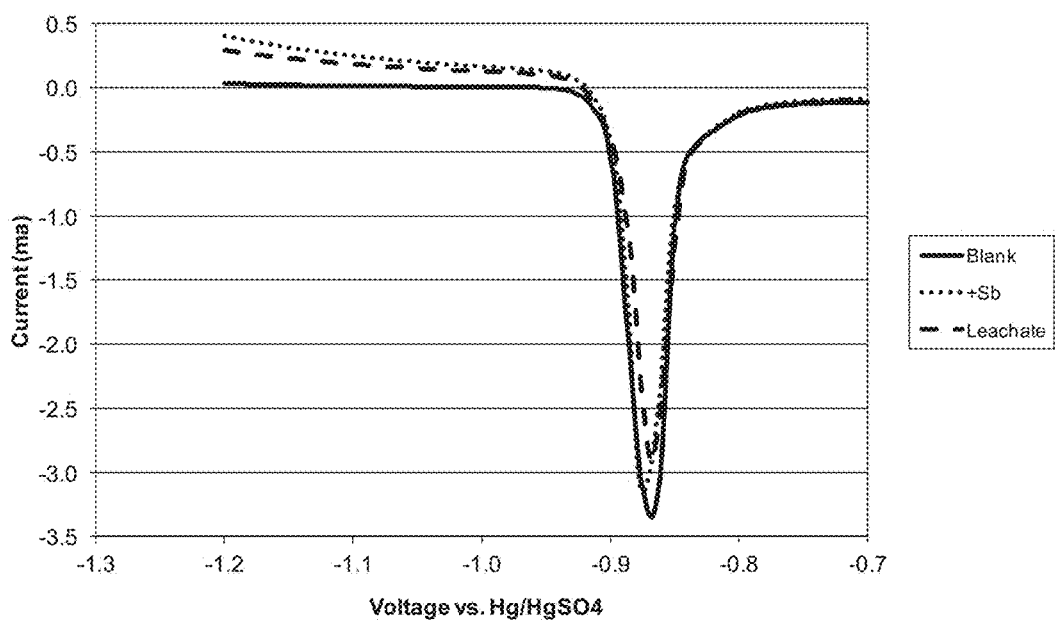
FIG. 4 is a graph showing the antimony suppression effect exhibited by the porous separator of Example 2.

FIG. 4 shows that the separator with the silica-rubber granules had a stronger antimony suppression effect than that of Edge Rubber rubber powder-containing separators tested. The effect is even stronger than that of some other Edge Rubber rubber powder samples/lots.

Figure 5:
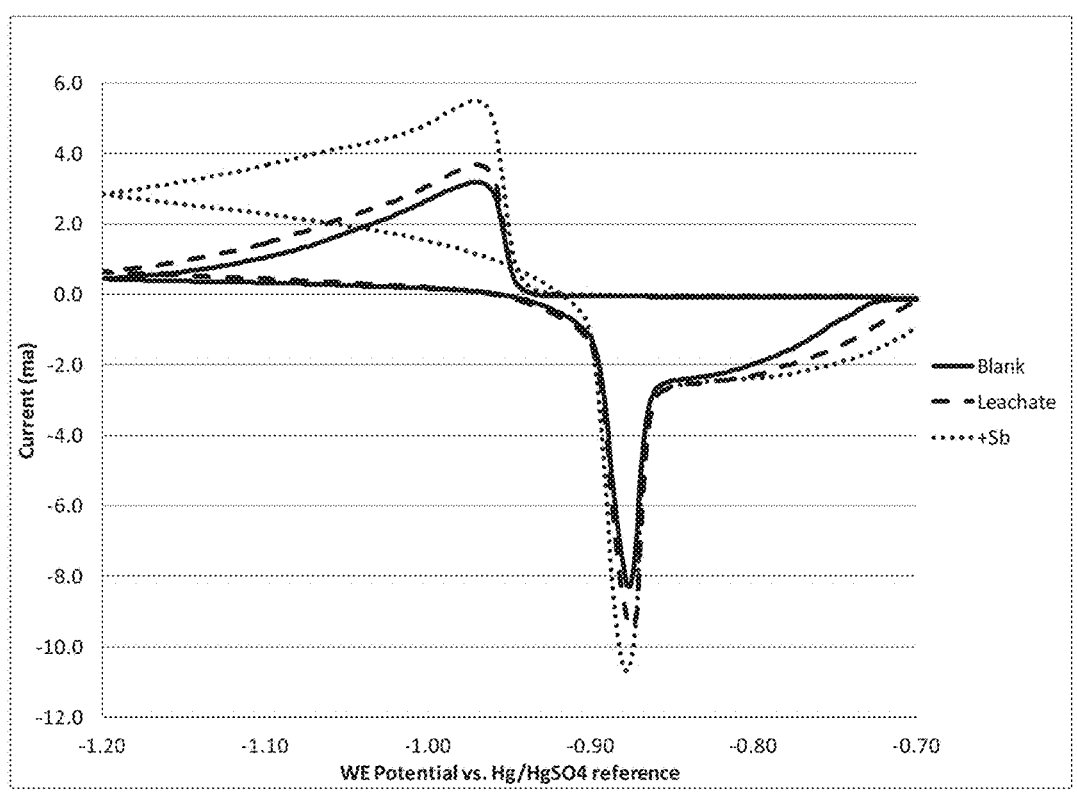
FIG. 5 is a graph showing the electrical current efficiency achieved by the porous separator of Example 2 in the presence of antimony in the acid electrolyte.

FIG. 5 shows that, in the antimony control test, higher current efficiency was achieved compared to conventional separators made with Edge Rubber rubber powder.

In summary, silica-rubber granules were used to produce a porous polyethylene separator sheet by an extrusion process. An even flow of extrudate was observed from the die, and uniform distribution of rubber particles was observed in the sheet. The resulting separator exhibited increased activity with respect to the reduction of hydrogen evolution. This performance was demonstrated by an ECC test, showing a strong decrease in hydrogen current; an AST showing a 1.31 selectivity value, which is higher than the 1.24 maximum selectivity value measured for any other separators made with Edge Rubber rubber powder; and an ACT, showing a 39.9% current efficiency, which is higher than the 32.5% maximum current efficiency measured for any other separators made with Edge Rubber rubber powder. These silica-rubber granules appear to offer potential performance benefits in the porous separator.

The following are prophetic examples of silica-rubber granule formation processes.

EXAMPLE 4

Silica-rubber granules are formed by spray-drying an aqueous dispersion of natural rubber latex and silica.

EXAMPLE 5

Silica-rubber granules are formed by precipitation of an aqueous or solvent dispersion of polymer/rubber powder/silica into a non-solvent for the polymer. A specific implementation of this example is polyvinyl alcohol, polyacrylamide, or polyvinylpyrolidone used as a water soluble polymer in an aqueous dispersion with rubber powder and silica. A droplet of this dispersion falling into methanol will cause these polymers to precipitate, and thereby hold together the rubber and silica. A drying process that removes the solvent leaves behind a granule.

Those having skill in the art will understand that many changes may be made to the details of the above-described embodiments without departing from the underlying principles of the invention. The scope of the present invention should, therefore, be determined only by the following claims.

The invention claimed is:

1. A silica-rubber granule, comprising:
a combination including a first amount of a silica component and a second amount of a rubber component, the first amount of the silica component being greater than the second amount of the rubber component, the combination of the first and second amounts of the respective silica and rubber components comprised in a granule in which the silica component of the granule is a carrier within which the rubber component is distributed, wherein the granule comprises a compression-formed granule established by the dry combination of the first and second amounts of the respective silica and rubber components, and wherein a ratio, by weight, of the first amount of the silica component to the second amount of the rubber component is from about 4:1 to about 9:1.

2. The silica-rubber granule of claim 1, wherein the silica component comprises a spray-dried silica component, the rubber component comprises a spray-dried rubber component, or both.

3. The silica-rubber granule of claim 2, wherein both the spray-dried silica component and the spray-dried rubber component are spray dried individually or in combination.

4. The silica-rubber granule of claim 2, wherein the spray-dried rubber component comprises a spray-dried rubber latex or spray-dried rubber slurry.

5. The silica-rubber granule of claim 1, wherein the silica component comprises precipitated silica, precipitated silica derivatives, fumed silica, fumed silica derivatives, or mixtures thereof.

6. The silica-rubber granule of claim 5, wherein the precipitated silica comprises amorphous precipitated silica.

7. The silica-rubber granule of claim 6, wherein the amorphous precipitated silica has a surface area of about 50 $m^2/g$ to about 350 $m^2/g$.

8. The silica-rubber granule of claim 1, wherein the silica component comprises a silica particle with a silane coupling agent attached to a surface of the silica particle.

9. The silica-rubber granule of claim 1, wherein the rubber component comprises a cross-linked rubber powder.

10. The silica-rubber granule of claim 1, further comprising a third amount of an additive.

11. The silica-rubber granule of claim 1, wherein the granule has a size of about 100 microns to about 5 mm.

12. A vehicle tire or a battery separator manufactured from a formulation comprising the silica-rubber granule of claim 1.

13. A method of manufacturing a battery separator, the method comprising:
mixing polyethylene with the silica-rubber granule of claim 1 and a plasticizer to form a mixture;
heating the mixture above the melting point of the polyethylene; and
extruding the heated mixture through a die.

14. The method of claim 13, wherein the polyethylene comprises ultra-high molecular weight polyethylene powder.

15. The method of claim 13, wherein the plasticizer comprises a process oil.

16. The method of claim 13, further comprising using spray-drying to form the silica component, the rubber component, or both of the silica-rubber granule, wherein in the case of both, then both the silica component and the rubber component are either formed individually or in combination.

17. A silica-rubber granule, comprising:
a combination including a first amount of a silica component and a second amount of a rubber component, the first amount of the silica component being greater than the second amount of the rubber component, the combination of the first and second amounts of the respective silica and rubber components comprised in a granule in which the silica component of the granule is a carrier within which the rubber component is distributed, wherein a ratio, by weight, of the first amount of the silica component to the second amount of the rubber component is from about 4:1 to about 9:1, wherein the granule comprises a compression-formed granule established by the combination of the first and second amounts of the respective silica and rubber components, and wherein the rubber component comprises a previously cross-linked rubber powder.

18. A silica-rubber granule, comprising:
a combination including a first amount of a silica component and a second amount of a rubber component, the first amount of the silica component being greater than the second amount of the rubber component, the combination of the first and second amounts of the respective silica and rubber components comprised in a compression-formed granule in which the silica component of the granule is a carrier within which the rubber component is distributed, wherein a ratio, by weight, of the first amount of the silica component to the second amount of the rubber component is from about 4:1 to about 9:1, wherein the precipitated silica comprises amorphous precipitated silica, and wherein the amorphous precipitated silica has a surface area of about 50 $m^2/g$ to about 350 $m^2/g$.

* * * * *